US008341616B2

(12) United States Patent
Kadashevich

(10) Patent No.: US 8,341,616 B2
(45) Date of Patent: Dec. 25, 2012

(54) UPDATING DIGITALLY SIGNED ACTIVE CONTENT ELEMENTS WITHOUT LOSING ATTRIBUTES ASSOCIATED WITH AN ORIGINAL SIGNING USER

(75) Inventor: A. Julie Kadashevich, Tyngsboro, MA (US)

(73) Assignee: International Business Machines Corporation, Armonk, NY (US)

( * ) Notice: Subject to any disclaimer, the term of this patent is extended or adjusted under 35 U.S.C. 154(b) by 1580 days.

(21) Appl. No.: 11/692,860

(22) Filed: Mar. 28, 2007

(65) Prior Publication Data
US 2008/0244554 A1    Oct. 2, 2008

(51) Int. Cl.
G06F 9/45 (2006.01)

(52) U.S. Cl. .......................................... 717/168; 726/26
(58) Field of Classification Search .................... 717/168
See application file for complete search history.

(56) References Cited

U.S. PATENT DOCUMENTS

| 5,659,616 | A | * | 8/1997 | Sudia ............................... 705/76 |
| 6,049,671 | A | * | 4/2000 | Slivka et al. .................... 717/173 |
| 6,209,091 | B1 | * | 3/2001 | Sudia et al. ..................... 713/175 |
| 6,584,495 | B1 | * | 6/2003 | Bisset et al. .................... 709/217 |
| 6,601,172 | B1 | * | 7/2003 | Epstein .......................... 713/178 |
| 6,606,744 | B1 | * | 8/2003 | Mikurak ........................ 717/174 |
| 6,986,133 | B2 | * | 1/2006 | O'Brien et al. ................ 717/173 |
| 7,017,041 | B2 | | 3/2006 | Sandhu et al. |
| 7,117,371 | B1 | * | 10/2006 | Parthasarathy et al. ........ 713/187 |
| 7,409,675 | B2 | * | 8/2008 | Brumme et al. ............... 717/114 |
| 7,809,648 | B2 | * | 10/2010 | Misra et al. ..................... 705/59 |
| 2004/0003389 | A1 | * | 1/2004 | Reynar et al. .................. 717/178 |
| 2004/0128395 | A1 | * | 7/2004 | Miyazaki ....................... 709/229 |
| 2005/0171908 | A1 | | 8/2005 | Carlsen et al. |
| 2005/0193369 | A1 | * | 9/2005 | Brumme et al. ............... 717/106 |
| 2005/0229171 | A1 | * | 10/2005 | Henry et al. ................... 717/168 |
| 2006/0143691 | A1 | * | 6/2006 | Peterson et al. ................... 726/2 |
| 2006/0168663 | A1 | * | 7/2006 | Viljoen et al. .................... 726/27 |
| 2006/0190545 | A1 | * | 8/2006 | Banerjee et al. ............... 709/206 |
| 2008/0052698 | A1 | * | 2/2008 | Olson et al. .................... 717/168 |
| 2009/0210702 | A1 | * | 8/2009 | Welingkar et al. ............. 713/156 |

* cited by examiner

Primary Examiner — Wei Zhen
Assistant Examiner — Matthew Brophy
(74) Attorney, Agent, or Firm — David A. Dagg

(57) ABSTRACT

A method and system for updating digitally signed active elements without losing attributes associated with an originally signing user. An updating entity determines the identity of an originally signing user from the original digital signature of an active content unit to be updated. Privileges associated with the original active content unit are determined from the original contents of the active content unit, or based on the identity of the originally signing user. The updating entity updates the active content unit with the new software version, and associates the original privileges for the active content unit with the new version of the active content unit. The updating entity stores the identity of the originally creating user in an On Behalf of: field of the updated active content unit. The updated active content unit is digitally signed by the updating entity. When a subsequent software update is received for the previously updated digitally signed active content unit, the updating entity determines that the On Behalf of: field is non-empty, and can then determine whether the previous signer has privileges allowing it to digitally sign for other users, and whether any privileges associated with (e.g. indicated within) the active content unit are available to the user identified in the On Behalf of: field. The privileges associated with subsequent updated version of the active content unit can advantageously be based on the identity of the user contained in the On Behalf of: field.

17 Claims, 3 Drawing Sheets

UPDATING DIGITALLY SIGNED ACTIVE CONTENT ELEMENTS WITHOUT LOSING ATTRIBUTES ASSOCIATED WITH AN ORIGINAL SIGNING USER

FIELD OF THE INVENTION

The present invention relates generally to digitally signed active content in a computer system, and more specifically to a method and system for updating digitally signed active elements without losing attributes associated with an original signing user.

BACKGROUND OF THE INVENTION

As it is generally known, in the contemporary terminology of computer science and the Internet, the term "active content" refers to digital content that is either interactive and/or dynamic. One example of a unit of active content is a software agent. A software agent is program code that operates to perform an action or actions for an associated user, either periodically or when a triggering event or sequence of events occurs. Some existing systems use software agents to provide "out of office" functions that automatically generate responses to messages, such as electronic mail ("e-mail") messages, that are sent to a user while that user is away and unable to personally respond. Such automatically generated response messages typically inform the message sender that the user cannot respond at the present time, that the user will be reading messages at a specified time in the future, and/or indicate an alternative user to contact for immediate assistance.

Units of active content, such as software agents, often have certain privileges (also sometimes referred to as "permissions", or "capabilities") associated with them. The privileges of a software agent typically flow from and are determined based on the identity of an associated user, e.g. a user that created the agent and/or that authorized the agent to execute. For example, in some cases, a software agent is created by a third party company, and then authorized to run by an end user, such as an e-mail application end user. Accordingly, the privileges of a software agent generally cannot exceed the privileges of the user for which that agent operates. For example, if a user is not allowed to create new databases manually, then that user should also not be allowed to create a new database through operation of an agent created by and/or authorized to run by that user. Privileges of a software agent may be stored as privilege indicators within the agent itself when the agent is created, based on the privileges available to the creating entity or user, and/or dynamically determined at run time based on the identity of the user associated with the agent, e.g. a user that created the agent and/or authorized the agent to run. Specific privileges may be represented using any specific type of indicator(s) (e.g. bits, flags, etc) of the programs (e.g. applications, Web sites, etc.) and/or data (e.g. databases, files, etc.) that the agent is allowed to access, and potentially also of the specific types of operations (e.g. reads, writes, modifies, etc.) that the agent is allowed to perform using the permitted programs and/or on the accessible data.

In order to ensure that a unit of active content, such as a software agent, operates securely, it may carry its own authentication credentials. The authentication credentials of a software agent allow confirmation that the privileges, content and/or capabilities of the agent have not been inappropriately modified. For example, a software agent may include a digital signature generated using the private encryption key of the user that created or enabled the agent. The digital signature is an encrypted digest of the contents of the software agent, including program code logic, and potentially also including the privilege indications contained in the agent. For example, a digital signature may be computed from the contents of a software agent using a one-way hash function such as MD5 (Message Digest 5) or SHA-1 (Secure Hash Algorithm 1), which is then encrypted with the private part of the user's public/private key pair. Such public/private key pairs are used in the RSA (Rivest-Shamir-Adleman) cryptography method, in which the private key is kept by an owner user, and the public key is published. To confirm that the software agent has not been tampered with, the associated user's public key can be used to decrypt the signature back into the original digest, which can then be compared to a new digest computed by an authenticating process. If the new digest matches the original, then the agent (including its privileges) has not been altered by an attacker.

A problem occurs in existing systems when a new version of program code is released to replace part of a digitally signed unit of active content. For example, when a user generates a software agent to automatically respond to e-mail messages sent to them while they are away, the agent may be digitally signed using the user's private key. During operation, in order to access the user's e-mail account, the agent presents the user's digital signature to the e-mail application program for authentication purposes. If a new version of software is released when such an agent is operating while the user is away, the user's private key cannot be accessed to re-sign the agent with the new software version, since the user is not available to log in and allow the private key to be accessed. Accordingly, at such a time, the new version of the agent cannot be digitally signed in the same way that the original agent was. Allowing an agent including a new version of software to run without being digitally signed by the associated user may cause its operations to be prevented since it cannot be authenticated by the e-mail application. Allowing the new version of the agent to be digitally signed using another private key may allow malicious changes to be made in privileges associated with the agent, thus creating a potential security problem. Moreover, if a another entity signs the new version of the agent, then it may be difficult or impossible for a subsequent update or other process to determine the correct attributes, such as privileges that were originally associated with the agent, to be associated with new versions of the agent.

These types of problems regarding updating digitally signed active content have resulted in some existing systems having to disable active software agents until the associated user logs in, at which point the updated versions can be digitally re-signed. In the case of software agents that are intended to continue operating even while an associated user is not logged in, such as an out of office agent that automatically answers e-mail messages while the user is away, this type of approach defeats the purpose of the agent.

It would accordingly be desirable to have a new system that allows software updates to digitally signed units of active content, such as software agents, that preserves originally defined attributes, such as privileges, and that does not require the associated user to re-sign the updated agent in order for a new version to become active.

SUMMARY OF THE INVENTION

To address the above described and other shortcomings of previous solutions, a method and system are disclosed for updating digitally signed active elements without losing attributes associated with an original signing user. In the disclosed system, when a new version of software for a digitally signed active content unit is received by an updating entity, such as an application server, application platform, or the like, an initial check is performed with regard to the new software. For example, such initial checking may include verifying a newly received version of an active content unit to make sure that it has been received from a known and trusted source, and not just the same identifying characteristics (e.g. database name, element name, etc.) as the existing active content unit it is intended to replace. If the initial checking fails, then no update is performed. Otherwise, the identity of the originally signing user is determined from the original digital signature of the active content unit. The identity of the originally signing user is then checked to determine whether that user has privileges to run active content units. If not, then no update is performed. If so, then the privileges associated with the original active content unit may also be determined from the original contents of the active content unit, or determined based on the identity of the originally signing user. The updating entity then updates the active content unit with the new version of software, and the original privileges for the active content unit may be stored in the new version of the active content unit if necessary.

An active content unit in the disclosed system is provided with a field referred to herein for purposes of explanation as the "On Behalf of:" field. The updating entity stores the previously determined identity of the originally signing user in the On Behalf of: field of the updated active content unit. The updated active content unit is then digitally signed by the updating entity. The updated active content unit can then be activated to replace the previous version. The updated active content unit is able to perform the operations it was originally intended to perform, since it can be authenticated based on the newly provided digital signature of the updating entity, and since it has associated with it the privileges that it was originally granted based on the identity of the original user.

When another software update is received for a previously updated unit of digitally signed active content, the updating entity determines that the contents of the On Behalf of: field are non-null (non-empty). The updating entity may then determine whether the previous signing entity (e.g. the updating entity) has privileges that allow it to digitally sign the active content unit for the user identified in the On Behalf of: field, and whether privileges associated with (e.g. indicated within) the active content unit are available to the user identified in the On Behalf of: field. Similarly, privileges associated with the updated version of the active content unit can advantageously be based on the identity of the user contained in the On Behalf of: field, thus enabling the updated active content unit to continue operation, while also preventing excess privileges from being granted to the updated active content unit.

Thus there is disclosed a new system for allowing software updates to digitally signed units of active content, such as software agents, that preserves attributes of the originally signing user (e.g. the identity of the originally signing user and/or indications of the originally defined privileges), and that does not require the originally signing user to re-sign the updated software in order for the new version to operate. The disclosed system advantageously allows an updating entity, such as an application server or platform, to digitally sign an updated active content unit on behalf of a user that originally created the active content unit, while associating only those privileges that were originally granted to the active content unit (i.e. only a set of privileges available to the originally signing user) to the updated active content unit. Advantageously, with regard to ensuring secure operation, the updated active content unit signed in this way in the disclosed system can only operate on the current application server or platform (i.e. the updating entity that signed the active content, and that trusts itself), or on any other server that explicitly lists the updating entity as a trusted entity. If the updating entity is not explicitly trusted by another application server, then the updated active content will not run on any other server than the current application server itself.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

DETAILED DESCRIPTION OF EXEMPLARY EMBODIMENTS

Figure 1:
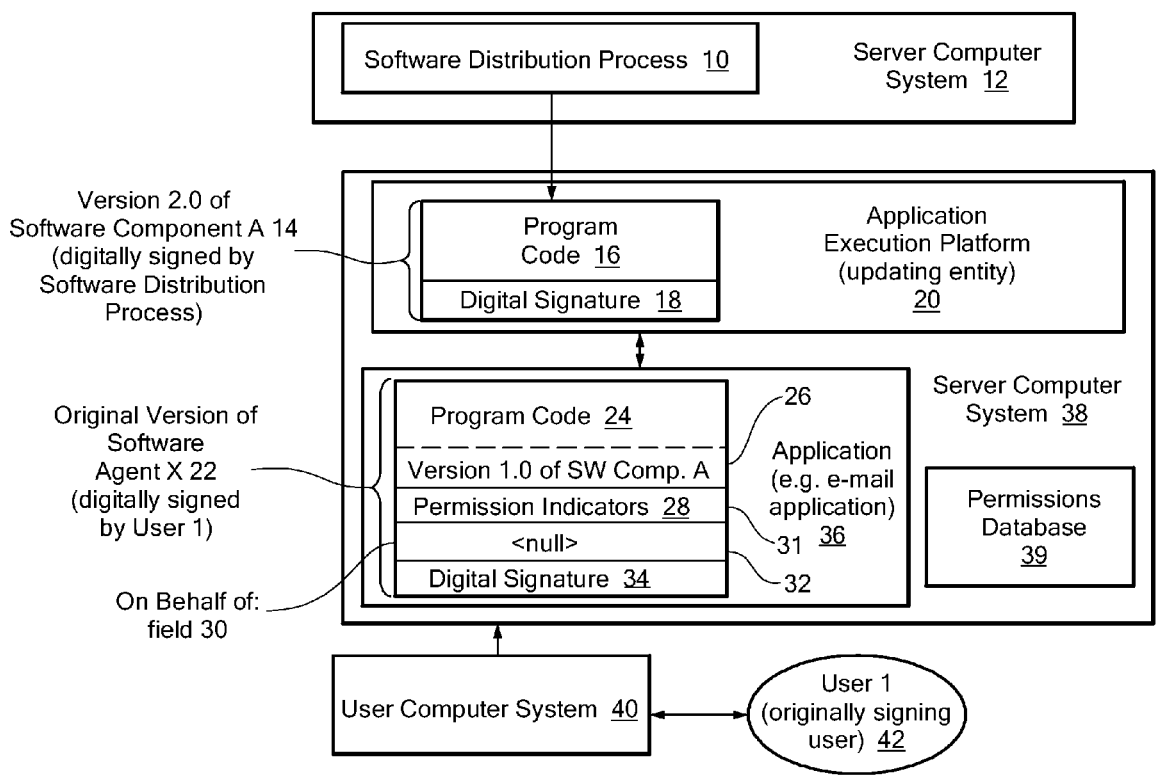
FIG. 1 is a first block diagram showing structure and operation of an illustrative embodiment of the disclosed system.

FIG. 1 is a first block diagram showing structure and operation of an illustrative embodiment of the disclosed system. As shown in FIG. 1, a Software Distribution Process 10 executing on a Server Computer System 12 provides Version 2.0 of Software Component A 14 to an Application Execution Platform 20 executing on a Server Computer System 38. The Application Execution Platform 20 shown in FIG. 1 is an example of software that is an updating entity in an embodiment of the disclosed system. For example, the Application Execution Platform 20 may provide an execution environment for the server application code of one or more application programs executing on the Server Computer system 36, shown for purposes of illustration by the Application 36. The Application 36 shown in FIG. 1 is an example of an application program which may operate with or include a signed unit of active content that may be updated through the disclosed system. The Application 36 may be any specific type of application program, such as, for example, an e-mail application. FIG. 1 further shows an Original Version of Software Agent X 22 that is an example of a digitally signed unit of active content operating with the Application 36. For example, Software Agent X may be a software agent that automatically responds to e-mail messages sent to User 1 42 while User 1 42 is away. Such software agents are sometimes referred to as "out of office" agents.

While the Application Execution Platform 20 is one example of an updating entity consistent with the present invention, the Application 36 itself may alternatively operate as the updating entity. In such an alternative embodiment, the Version 2.0 of Software Component A 14 would be delivered to the Application 36.

Version 2.0 of Software Component A 14 is digitally signed by the Software Distribution Process 10. The Digital Signature 18 is accordingly generated using a private encryption key belonging to the Software Distribution Process 10, consistent with a public-key encryption technique such as RSA or the like. The Digital Signature 18 enables the updating entity on Server Computer System 38 to authenticate Version 2.0 of Software Component A 14 prior to performing any software updates, for example using a public key associated with the Software Distribution Process 10. Version 2.0 of Software Component A 14 further includes Program Code 16 that is to be used as a replacement for a previous version of Software Component A during an update operation.

The Software Distribution Process 10 may include any specific type of software version update logic, providing pushes of newer versions of software components to replace older versions, or serving as a source of such newer versions that may be pulled by other systems as needed.

The Original Version of Software Agent X 22 is digitally signed by User 1 42. Accordingly, in the example of FIG. 1, User 1 42 is the originally signing user. The Digital Signature 34 was created using a private encryption key belonging to User 1 42, consistent with public-key encryption techniques. For example, the Digital Signature 34 is generated across the complete content of Original Version of Software Agent X 22 when User 1 42 set up Original Version of Software Agent X 22 during a user application session with the Application 36. Such a user application session may involve User 1 42 providing credentials such as a user name and password to the Application 36 through client software executing on the User Computer System 40, thus allowing access to the private key belonging to User 1 42 for generation of the Digital Signature 34.

The Original Version of Software Agent X 22 is further shown including an On Behalf of: field 30. As shown in FIG. 1, when the Original Version of Software Agent 22 is initially set up by User 1 42, the contents of the On Behalf of: field 30 is <null>, indicating that the Original Version of Software Agent X 22 is digitally signed by the originally signing user (i.e. User 1 42). The example of Original Version of Software Agent X 22 is further shown in FIG. 1 as including Permission Indicators 28 in a permissions field 31. The Permission Indicators 28 indicate the permissions (also known as rights, privileges, capabilities, etc.) that are associated with the Original Version of Software Agent X 22. The Permission Indicators 28 may include any specific type of indicator(s) (e.g. bits, flags, etc) of programs (e.g. applications, Web sites, etc.) and/or data (e.g. databases, files, etc.) that the Original Version of Software Agent X 22 is allowed to access, and potentially also of the specific types of operations (e.g. reads, writes, modifies, etc.) that Original Version of Software Agent X 22 is allowed to perform using the permitted programs and/or on the accessible data. For example, in the case where Software Agent X automatically responds to e-mail messages sent to User 1 42, the Permission Indicators 28 would indicate that Software Agent X is allowed to access the e-mail application (e.g. Application 36), as well as those messages stored by or in the e-mail application that belong to User 1 42, and the Software Agent X is allowed to send e-mail response messages from the e-mail account of User 1 42 while User 1 42 is away.

While the example of FIG. 1 shows Permission Indicators 28 included within Original Version of Software Agent X 22, the present invention is not limited to such an approach. For example, in an alternative embodiment, the permissions associated with a given software agent may be determined based on the identity of the original signer of the agent. The disclosed system enables the identity of the original signer of an agent to be determined based on the contents of the On Behalf of: field 30. In the Original Version of Software Agent X 22 shown in FIG. 1, the value of the On Behalf of: field 30 is <null>, indicating that the Digital Signature 34 was generated using the private encryption key of the originally signing user (e.g. User 1 42). Accordingly, in such a case, the identity of the originally signing user can be determined from the contents of the Digital Signature 34. As discussed further below, when the value of the On Behalf of: field 30 is non-null, then the digital signature for the agent was created using a private encryption key of an updating entity other than the originally signing user. In that case, the value of the On Behalf of: field 30 is an identifier of the originally signing user. Thus in either case, the disclosed system enables determination of the identity of the originally signing user, either from the contents of the digital signature for the agent, or from the contents of the On Behalf of: field 30. Therefore, in an alternative embodiment, the permissions associated with a software agent need not be contained within the software agent itself, but can be determined dynamically, as needed, either during operation of the software agent or during a software update operation, from an external record of permissions granted to the originally signing user, for example as stored within a Permissions Database 39 or the like within the Server Computer System 38 or another computer system.

The Original Version of Software Agent X 22 is further shown including Program Code 24, which includes Version 1.0 of Software Component A 26. During operation of the embodiment of the disclosed system shown in FIG. 1, a determination is made, for example by the Software Distribution Process 10 and/or the updating entity on Server Computer System 38, that the Original Version of Software Agent X 22 includes an out of date version of Software Component A (i.e. Version 1.0 of Software Component A 26), and that a more recent version is available (i.e. Version 2.0 of Software Component A 14. As a result of this determination, the disclosed system causes Version 2.0 of Software Component A 14 to be transferred from Server Computer System 12 to Server Computer System 38, e.g. via either a push or a pull operation. Upon receipt of Version 2.0 of Software Component A 14, the updating entity on Server Computer System 38 (e.g. Application Execution Platform 20) authenticates Version 2.0 of Software Component A 14 based on the Digital Signature 18. If Version 2.0 of Software Component A 14 cannot be authenticated, then no software update is performed using Version 2.0 of Software Component A 14. Otherwise, if Version 2.0 of Software Component A 14 is successfully authenticated by the updating entity on Server Computer System 38, then the updating entity determines the identity of the originally signing user for the Original Version of Software Agent X 22 based on the contents of the Digital Signature 34. The updating entity knows that the originally signing user created the Digital Signature 34 because the On Behalf of: field 30 has a <null> contents. The updating entity writes an identifier associated with the originally signing user into the On Behalf of: field 30, and copies or maintains the Permission Indicators 28 from the Original Version of Software Agent X 22 within the permissions field 31. The updating entity also replaces Version 1.0 of Software Component A 26 with the Program Code 16 for Version 2.0 of Software Component A 14 to create an updated version of Software Agent X, as illustrated by the Updated Version of Software Agent X 56 shown in FIG. 2. The updating entity also digitally signs the Updated Version of Software Agent X 56 using its own private encryption key, thus generating the Digital Signature 64 also shown in FIG. 2.

Figure 2:
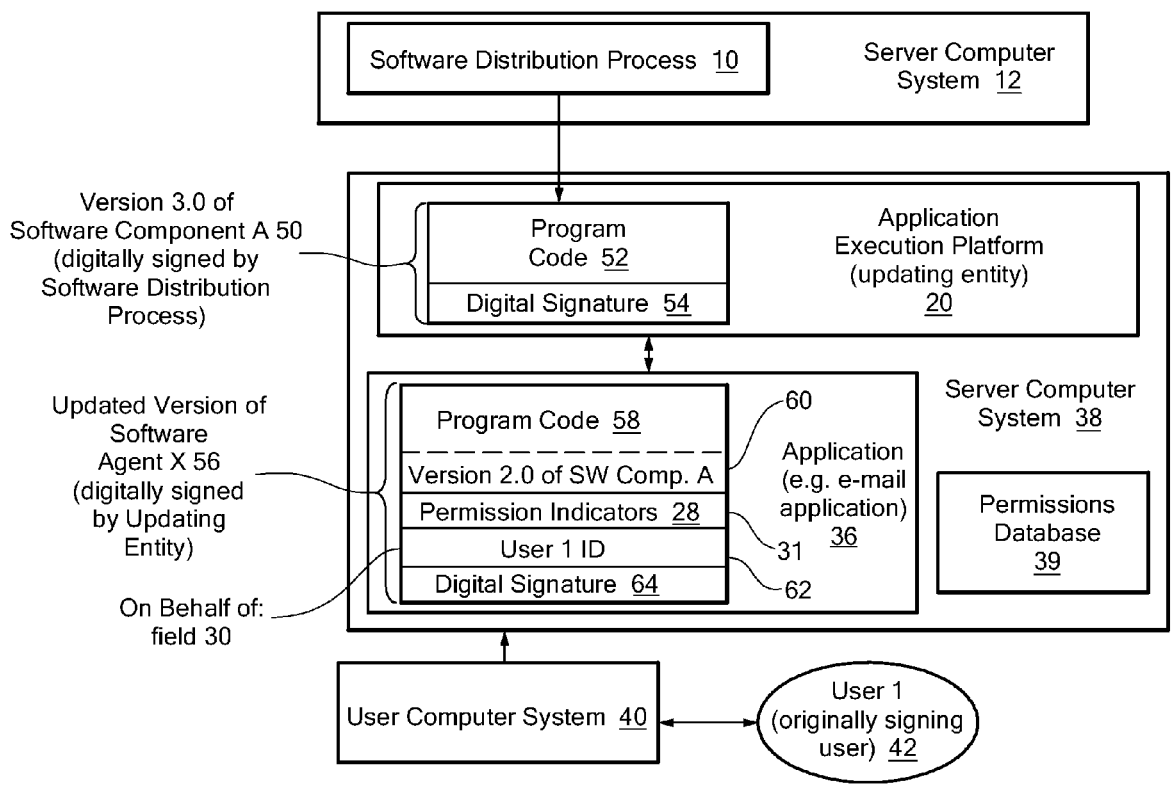
FIG. 2 is a block diagram showing the illustrative embodiment of FIG. 1 after a software update has been performed on an active content unit.

As further shown in FIG. 2, an identifier "User 1 ID" 62 has been written into the On Behalf of: field 30 of Updated Version of Software Agent X 56, and Version 2.0 of Software Component A 60 is now part of the updated Program Code 58. When a new Version 3.0 of Software Component A 50 becomes available, it is obtained by or provided to the updating entity for Server Computer System 38, and includes a Digital Signature 54 generated with a private encryption key associated with the Software Distribution Process 10. The updating entity then checks the On Behalf of: field 30, and determines that the On Behalf of: field 30 contains a non-null value. The updating entity can the use the contents of On Behalf of: field 30 (e.g. User 1 ID 62), to determine the identity of the originally signing user (e.g. User 1 42). Based on the identity of the originally signing user, the updating entity can then verify that the Permission Indicators 28 in permissions field 31 are consistent with (i.e. do not exceed) permissions available or assigned to the originally signing user in a user permissions database (e.g. Permissions Database 39). If so, then the Permission Indicators 28 can be maintained in the permissions field 31, Version 2.0 of Software Component A 60 in Program Code 58 can be replaced with the Program Code 52 for Version 3.0 of Software Component A 50, and the resulting version of the software agent can be re-signed by the updating entity.

The Server Computer System 12, Server Computer System 38, and User Computer System 40 may each include at least one processor, program storage, such as memory and/or another computer readable medium, for storing program code (e.g. the Software Distribution Process 10, Application Execution Platform 20, Application 36, Original Version of Software Agent X 22, Version 2.0 of Software Component A 14, Version 3.0 of Software Component A 50, and Updated Version of Software Agent 56) executable on such processors, and for storing data operated on by such program code (e.g. a user permissions database indicating permissions associated with specific users). The Server Computer System 12, Server Computer System 38, and User Computer System 40 may each further include one or more input/output devices and/or interfaces, such as data communication and/or peripheral devices and/or interfaces, as well as appropriate operating system software. The Server Computer System 12, Server Computer System 38, and User Computer System 40 are communicably connected via a communication network such as a local area network (LAN) or the like, and/or the Internet.

Figure 3:
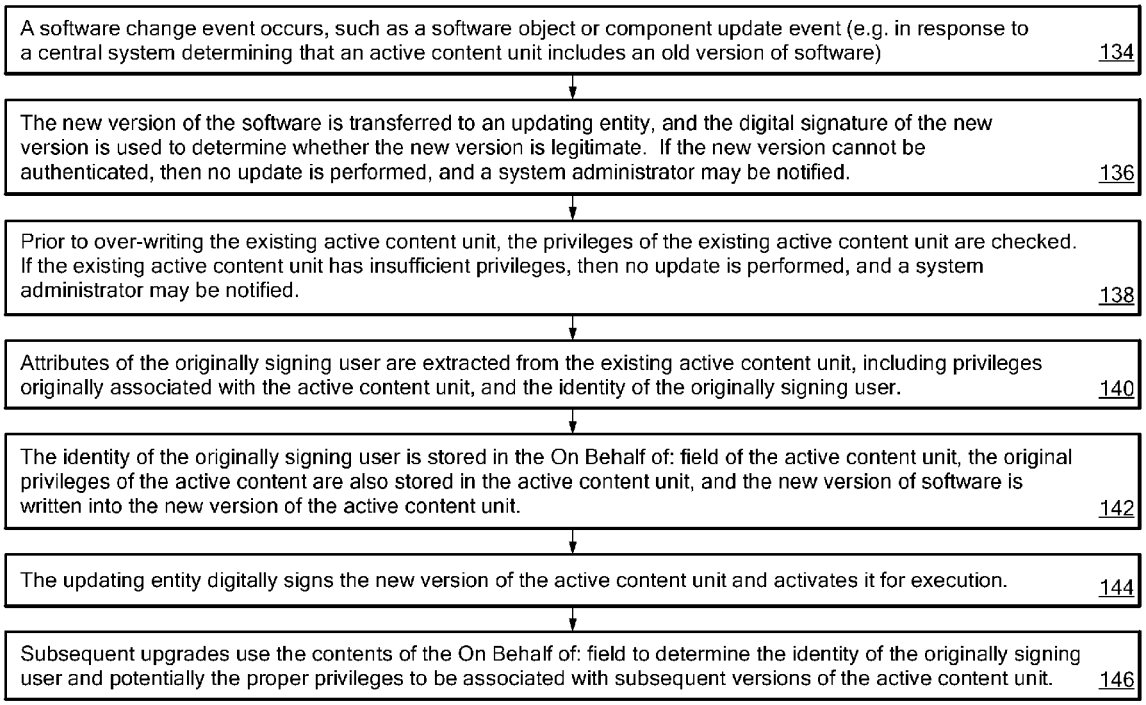
FIG. 3 is a flow chart showing steps performed by an illustrative embodiment of the disclosed system.

FIG. 3 is a flow chart showing steps performed by an illustrative embodiment of the disclosed system. As shown in FIG. 3, at step 134 a software change event occurs, such as an software object or component update event. For example, at step 134, the disclosed system may determine that a unit of active content, such as a software agent or the like, is currently operating using an old version of a software component or module, and a new version to replace the old version is currently available for downloading. At step 136, the new version of the software component or module is transferred to an updating entity. The new version of the component or module is digitally signed by the software distribution process executing on a remote server system or the like from which the new version is distributed. The updating entity operates to determine whether the new version of the software component or module is legitimate by authenticating the new version based on the digital signature accompanying the new version and generated by the software distribution process. For example, a public key encryption type authentication technique may be used in this regard. The authentication performed at step 136 ensures that the new version is received from a known and trusted source. If the new version cannot be authenticated at step 136, then no update is performed, and a system administrator may be notified (e.g. by e-mail or another notification process).

At step 138, prior to over-writing an existing version of the active content unit that is to be updated, the disclosed system checks the privileges associated with the existing active content unit. For example, such privileges may be indicated within part of the existing active content unit, or may be determined based on the identity of the originally signing user of the active content unit. For example, the originally signing user of an active content unit that is a software agent may be the user that authorized and/or initiated the software agent to perform a given task, such as responding to e-mail messages while the user is away. In such an example, when the software agent was created, the private key of the originally signing user would then be used to create the digital signature for the agent. The first time an active content unit is updated, the identity of the originally signing user may be determined at step 38 based on the digital signature of the existing active content unit. For subsequent updates, as further described below, the identity of the originally signing user may be determined from the contents of the contents of the On Behalf Field:

If the privileges associated with the existing active content unit are insufficient (e.g. no privileges, no privilege to execute agents, no privilege to update agents, etc.) then no update is performed, and a system administrator may further be notified at step 138 (e.g. by e-mail or another notification process).

At step 140, if the privileges associated with the existing active content unit are sufficient to allow a software version update and activation of the updated active content unit, then the attributes of the originally signing user are extracted from the existing active content unit, including the privileges originally associated with the active content unit (e.g. from indications within the active content unit or from an external privileges database based on the identity of the originally signing user), and the identity of the originally signing user. For example, in the case of the first update performed on the active content unit, the identity of the originally signing user is obtained based on the digital signature for the existing active content unit.

At step 142, again in the case of the first time the active content unit is being updated, the disclosed system stores the identity of the originally signing user in the On Behalf of: field of the active content unit. In subsequent updates to the active content unit, the identity of the originally signing user will already have been stored in the On Behalf of: field. The original privileges associated with the active content also may be stored in the active content unit if necessary, for example as determined in step 140. Further at step 142, the new version of the software component or module is written into the new version of the active content unit.

At step 144, the updating entity digitally signs the new version of the active content unit and activates it for execution. Note that the updating entity is not the originally signing user, and can perform the update to the active content unit even when the originally signing user is not available (e.g. out of the office, on vacation, etc.). As noted above, examples of updating entities include application execution platforms, application programs (e.g. an e-mail application server process or the like), and/or any other specific type of software process set up to automatically handle updates to digitally signed active content units, such as software agents, on behalf of an associated, originally signing user that may be currently unavailable.

As indicated in step 146, following the initial upgrade performed to the active content unit, the On Behalf of: field contains an identifier for the originally signing user, and subsequent upgrades accordingly are performed using the contents of the On Behalf of: field to determine the identity of the originally signing user, and to determine and/or check the proper privileges to be associated with subsequent versions of the active content unit if necessary. For example, the identity of the originally signing user obtained from the On Behalf of: field may be used to determine the privileges that are to be associated with the new version of the active content unit based on a set of privileges contained in a privileges database, and associated with the identity of the originally signing user. Privileges obtained from such a database using the identity of the originally signing user at the time of the update, for example, may be stored within or in association with the new version of the active content unit so that the privileges of the new version of the active content unit match the privileges associated with the originally signing user of the active content unit.

The disclosed system can take the form of an entirely software embodiment, an entirely hardware embodiment, or an embodiment containing both software and hardware elements. The figures include block diagram and flowchart illustrations of methods, apparatus(s) and computer program products according to an embodiment of the invention. It will be understood that each block in such figures, and combinations of these blocks, can be implemented by computer program instructions. These computer program instructions may be loaded onto a computer or other programmable data processing apparatus to produce a machine, such that the instructions which execute on the computer or other programmable data processing apparatus create means for implementing the functions specified in the block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block or blocks.

Those skilled in the art should readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); (b) information alterably stored on writable storage media (e.g. floppy disks and hard drives); or (c) information conveyed to a computer through communication media for example using wireless, baseband signaling or broadband signaling techniques, including carrier wave signaling techniques, such as over computer or telephone networks via a modem.

While the invention is described through the above exemplary embodiments, it will be understood by those of ordinary skill in the art that modification to and variation of the illustrated embodiments may be made without departing from the inventive concepts herein disclosed.

I claim:

1. A method of updating an original version of a unit of active content, comprising:
   receiving, by an updating entity, a new version of program code for replacing at least a portion of said original version of said unit of active content, wherein said original version of said unit of active content contains a digital signature generated using a private encryption key belonging to said originally signing user;
   determining, by said updating entity, the identity of said originally signing user from said digital signature contained in said original version of said unit of active content;
   storing, by said updating entity, an indication of said identity of said originally signing user in a field within a new version of said unit of active content, wherein said field associates said new version of said unit of active content with at least one privilege associated with said originally signing user;
   writing, by said updating entity, said new version of program code into said new version of said unit of active content; and
   digitally signing, by said updating entity, said new version of said unit of active content, including generating a digital signature using a private encryption key belonging to said updating entity.

2. The method of claim 1, wherein said updating entity comprises application server software associated with an application program.

3. The method of claim 1, wherein said updating entity comprises an application platform server software for execution of at least one application program.

4. The method of claim 1, further comprising: wherein said new version of program code is received from a program code distribution source; wherein said new version of program code is digitally signed with a digital signature generated using a private encryption key belonging to said program code distribution source; and authenticating said new version of program code, based on said digital signature generated using a private encryption key belonging to said program code distribution source, prior to updating said digitally signed unit of active content.

5. The method of claim 1, further comprising: determining a set of privileges associated with said original version of said unit of active content; and storing indication of said set of privileges associated with said original version of said unit of active content prior to said digitally signing said new version of said unit of active content by updating entity.

6. The method of claim 1, wherein said unit of active content comprises a software agent operable to automatically respond to electronic mail messages sent to said originally signing user.

7. The method of claim 1, further comprising: receiving a second new version of program code for replacing at least a portion of said updated version of said unit of active content; determining said identity of said originally signing user from said indication of said identity of said originally signing user in said field within said new version of said unit of active content; and determining a set of privileges to be associated with a second new version of said unit of active content including said second new version of program code based on said identity of said originally signing user.

8. The method of claim 7, further comprising: determining, responsive to said digital signature in said new version of said unit of active content generated using said private encryption key belonging to said updating entity, an identity of said updating entity: and prior to generating said second new version of said unit of active content, determining whether said updating entity has sufficient privileges to digitally sign said unit of active content on behalf of said originally signing user.

9. A system including a non-transitory computer readable storage medium, said non-transitory computer readable storage medium having program code stored thereon for updating an original version of a unit of active content, wherein said program code, when executed, is operable to cause a computer system to:

receive, by an updating entity, a new version of program code for replacing at least a portion of said original version of said unit of active content, wherein said original version of said unit of active content contains a digital signature generated using a private encryption key belonging to said originally signing user;

determine, by said updating entity, the identity of said originally signing user from said digital signature contained in said original version of said unit of active content;

store, by said updating entity, an indication of said identity of said originally signing user in a field within a new version of said unit of active content, wherein said field associates said new version of said unit of active content with at least one privilege associated with said originally signing user;

write said new version of program code into said new version of said unit of active content; and digitally sign, by the updating entity, said new version of said unit of active content, including generation of a digital signature using a private encryption key belonging to said updating entity.

10. The system of claim 9, wherein said updating entity comprises application server software associated with an application program.

11. The system of claim 9, wherein said updating entity comprises an application platform server software for execution of at least one application program.

12. The system of claim 9, further comprising: wherein said new version of program code is received from a program code distribution source; wherein said new version of program code is digitally signed with a digital signature generated using a private encryption key belonging to said program code distribution source; and wherein said program code, when executed, is further operable to cause said computer system to authenticate said new version of program code, based on said digital signature generated using a private encryption key belonging to said program code distribution source, prior to updating said digitally signed unit of active content.

13. The system of claim 9, wherein said program code, when executed, is further operable to cause said computer system to: determine a set of privileges associated with said original version of said unit of active content; and store indication of said set of privileges associated with said original version of said unit of active content prior to said digitally signing said new version of said unit of active content by updating entity.

14. The system of claim 9, wherein said unit of active content comprises a software agent operable to automatically respond to electronic mail messages sent to said originally signing user.

15. The system of claim 9, wherein said program code, when executed, is further operable to cause said computer system to: receive a second new version of program code for replacing at least a portion of said updated version of said unit of active content; determine said identity of said originally signing user from said indication of said identity of said originally signing user in said field within said new version of said unit of active content; and determine a set of privileges to be associated with a second new version of said unit of active content including said second new version of program code based on said identity of said originally signing user.

16. The system of claim 15, wherein said program code, when executed, is further operable to cause said computer system to: determine, responsive to said digital signature in said new version of said unit of active content generated using said private encryption key belonging to said updating entity, an identity of said updating entity: and prior to generating said second new version of said unit of active content, determine whether said updating entity has sufficient privileges to digitally sign said unit of active content on behalf of said originally signing user.

17. A computer program product including a non-transitory computer readable storage medium, said non-transitory computer readable storage medium having program code stored thereon for updating an original version of a unit of active content, wherein said program code, when executed, is operable to cause a computer system to:

receive, by an updating entity, a new version of program code for replacing at least a portion of said original version of said unit of active content, wherein said original version of said unit of active content contains a digital signature generated using a private encryption key belonging to said originally signing user;

determine, by said updating entity, the identity of said originally signing user from said digital signature contained in said original version of said unit of active content, wherein said field associates said new version of said unit of active content with at least one privilege associated with said originally signing user;

store, by said updating entity, an indication of said identity of said originally signing user in a field within a new version of said unit of active content;

write said new version of program code into said new version of said unit of active content; and digitally sign, by said updating entity, said new version of said unit of active content, including generation of a digital signature using a private encryption key belonging to said updating entity.

* * * * *